United States Patent
Nguyen et al.

(10) Patent No.: US 10,729,079 B2
(45) Date of Patent: Aug. 4, 2020

(54) MICROGRAVITY AGRICULTURE DEVICE

(71) Applicant: Dart Industries Inc., Orlando, FL (US)

(72) Inventors: Van Anh Nguyen, Orlando, FL (US); Adrian Anderson, Orlando, FL (US); Hector J. Barea, Orlando, FL (US); David D. Kusuma, Orlando, FL (US); Edward M. Poslinski, Orlando, FL (US); Raymond J. Trudeau, Orlando, FL (US); James Michael Wiggins, Orlando, FL (US); Everett V. Goings, III, Orlando, FL (US)

(73) Assignee: Dart Industries Inc., Orlando, FL (US)

( * ) Notice: Subject to any disclaimer, the term of this patent is extended or adjusted under 35 U.S.C. 154(b) by 222 days.

(21) Appl. No.: 15/942,809

(22) Filed: Apr. 2, 2018

(65) Prior Publication Data
US 2019/0297801 A1 Oct. 3, 2019

(51) Int. Cl.
*A01G 27/06* (2006.01)
*A01G 27/00* (2006.01)
*A01G 31/02* (2006.01)

(52) U.S. Cl.
CPC .......... *A01G 27/06* (2013.01); *A01G 27/008* (2013.01); *A01G 31/02* (2013.01)

(58) Field of Classification Search
CPC .... A01G 27/00; A01G 27/006; A01G 27/008; A01G 27/02; A01G 27/06; A01G 31/00; A01G 31/02
USPC ..................................... 47/66.1, 66.6, 79, 81
See application file for complete search history.

(56) References Cited

U.S. PATENT DOCUMENTS

| | | | | | |
|---|---|---|---|---|---|
| 4,399,634 A | * | 8/1983 | O'Hare | .................. | A01G 31/00 47/59 R |
| 4,756,120 A | * | 7/1988 | Arledge | .................. | A01G 31/06 47/59 R |
| 6,061,957 A | * | 5/2000 | Takashima | ............. | A01G 22/15 47/66.1 |
| 6,951,076 B2 | * | 10/2005 | Winsbury | .............. | A01G 31/02 47/59 R |
| 2009/0205251 A1 | * | 8/2009 | Irmler | ...................... | A01G 9/02 47/79 |
| 2012/0005957 A1 | * | 1/2012 | Downs, Sr. | ............ | A01G 31/02 47/62 A |
| 2012/0186153 A1 | * | 7/2012 | Bradley | ................. | A01G 31/02 47/60 |

(Continued)

OTHER PUBLICATIONS

U.S. Appl. No. 62/458,607 entitled "Passive Nutrient Delivery System (PoNDS)" filed on Feb. 14, 2017.

*Primary Examiner* — Peter M Poon
*Assistant Examiner* — Danielle A Clerkley
(74) *Attorney, Agent, or Firm* — Taylor J. Ross

(57) ABSTRACT

A microgravity agriculture device includes a root cylinder providing a growing medium for the plant and intended for root growth. The root cylinder will extend into a water tank, and the root cylinder will include apertures and wicking elements to draw water from the water tank into the root cylinder for availability to the plant roots. The geometries of the water tank, root cylinder, apertures and wicking elements are designed in a manner to ensure water surface tension will cause water in the tank to fill and stay in the proper areas to ensure water flow to the plant, no obstruction of vents during tank filling, and no egress of the water through the vents.

19 Claims, 5 Drawing Sheets

(56) References Cited

U.S. PATENT DOCUMENTS

| | | | |
|---|---|---|---|
| 2013/0255152 A1* | 10/2013 | Johnson | A01G 31/02 47/62 C |
| 2014/0190078 A1* | 7/2014 | Kim | A01G 31/02 47/62 A |
| 2017/0086397 A1* | 3/2017 | Sutton | A01G 2/20 |

* cited by examiner

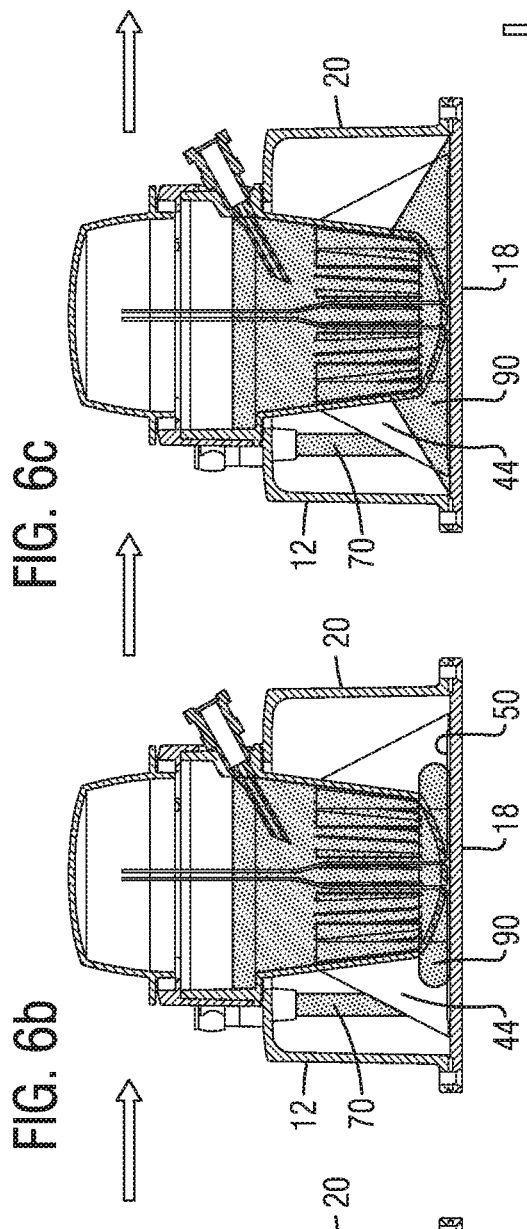
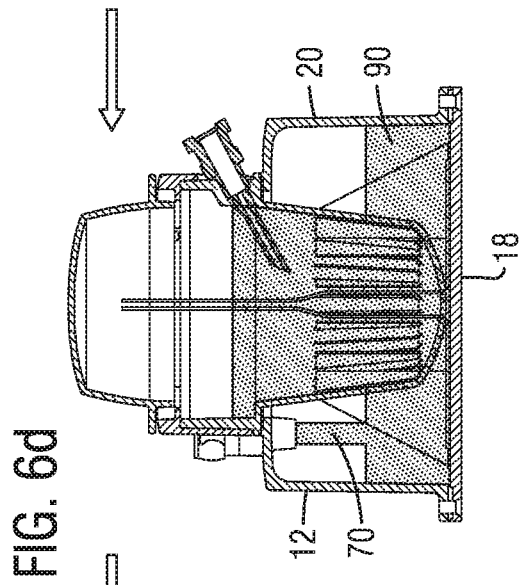
FIG. 6a  FIG. 6b  FIG. 6c  FIG. 6d  FIG. 6e

MICROGRAVITY AGRICULTURE DEVICE

CROSS REFERENCE TO RELATED APPLICATIONS

Not applicable.

STATEMENT REGARDING FEDERALLY SPONSORED RESEARCH

Not applicable.

BACKGROUND OF THE INVENTION

The present invention relates in general to devices for growing plants in zero gravity or microgravity. In particular it relates to such a device which is unpowered and passive in delivery of nutrients and water.

It is a well-known desire to grow plants within spacecraft in a microgravity or zero gravity environment. These plants would not only capture carbon dioxide while producing oxygen, but could also be a source of food. Conversely, the plants require water which is both difficult to contain within a microgravity or zero gravity environment, and dangerous to electronic or electrical equipment.

Several devices have been proposed for growing plants in such environments. Several of these rely upon electric powered pumps to supply water. It is preferred to conserve energy where possible, so passive systems including wicking mats have also been proposed.

SUMMARY OF THE INVENTION

An object of the present invention is to provide a device for growing plants in microgravity or zero gravity environments.

Another object of the present invention is to provide such a device which is passive and requires no power to deliver water and nutrients.

A further object of the present invention is to provide such a device with improved water storage properties to ensure clean venting while water is added.

These and other objects are achieved by a microgravity agriculture device. The device will include a root cylinder providing a growing medium for the plant and intended for root growth. This root cylinder will extend into a water tank, and the root cylinder will include apertures and wicking elements to draw water from the water tank into the root cylinder for availability to the plant roots. The geometries of the water tank, root cylinder, apertures and wicking elements are designed in a manner to ensure water surface tension will cause water in the tank to fill and stay in the proper areas to ensure water flow to the plant, no obstruction of vents during tank filling, and no egress of the water through the vents.

BRIEF DESCRIPTION OF THE DRAWINGS

The objects and features of the invention noted above are explained in more detail with reference to the drawings, in which like reference numerals denote like elements, and in which:

FIGS. 6a-6e are cross-sectional views of the device illustrating the water fill characteristics of the present device.

DETAILED DESCRIPTION OF THE INVENTION

Figure 1:
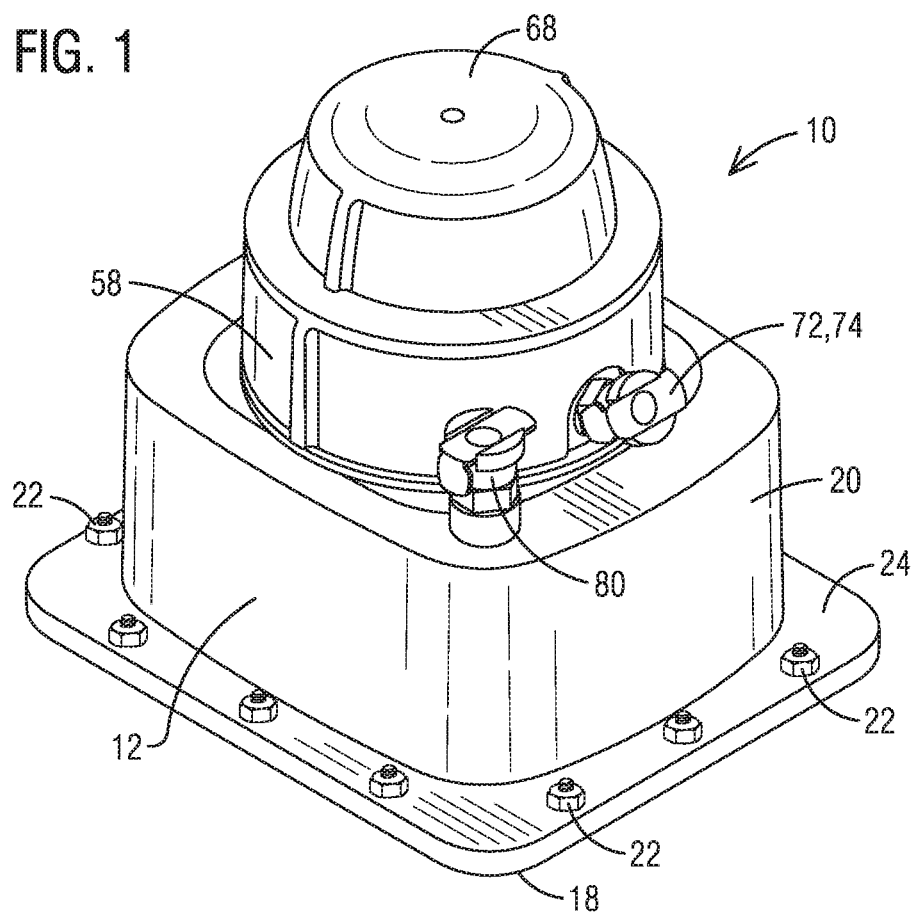
FIG. 1 is a top isometric view of the microgravity agriculture device according to the present invention in the germination configuration.

With reference to FIG. 1, a microgravity agriculture device according to the present invention is generally designated by reference numeral 10. The device 10 is intended for use within microgravity, zero gravity, and thrust conditions. For ease of narrative, the term microgravity shall be understood to include both microgravity and zero gravity unless otherwise noted.

Figure 2:
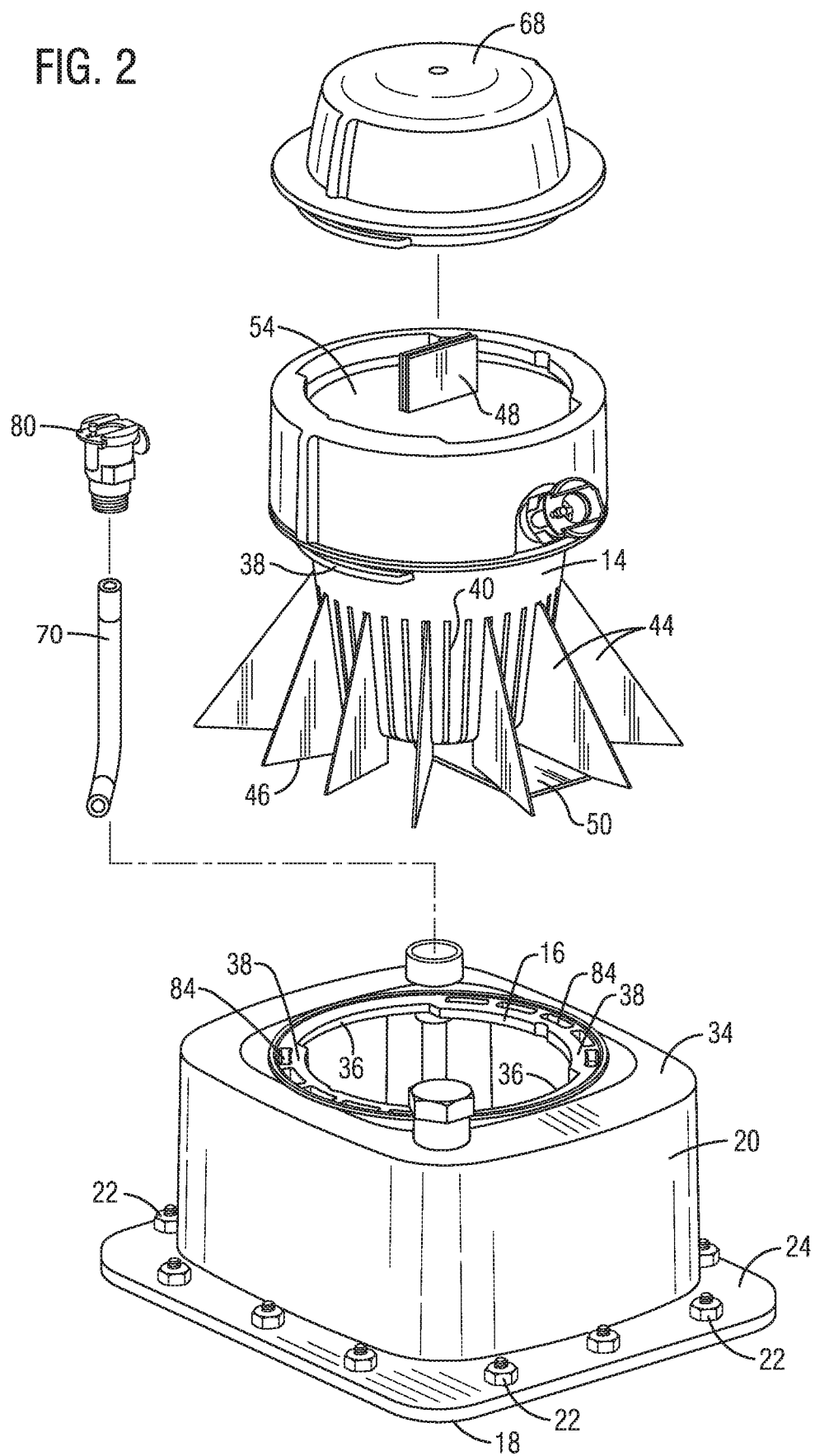
FIG. 2 is an exploded top isometric view thereof.
Figure 3:
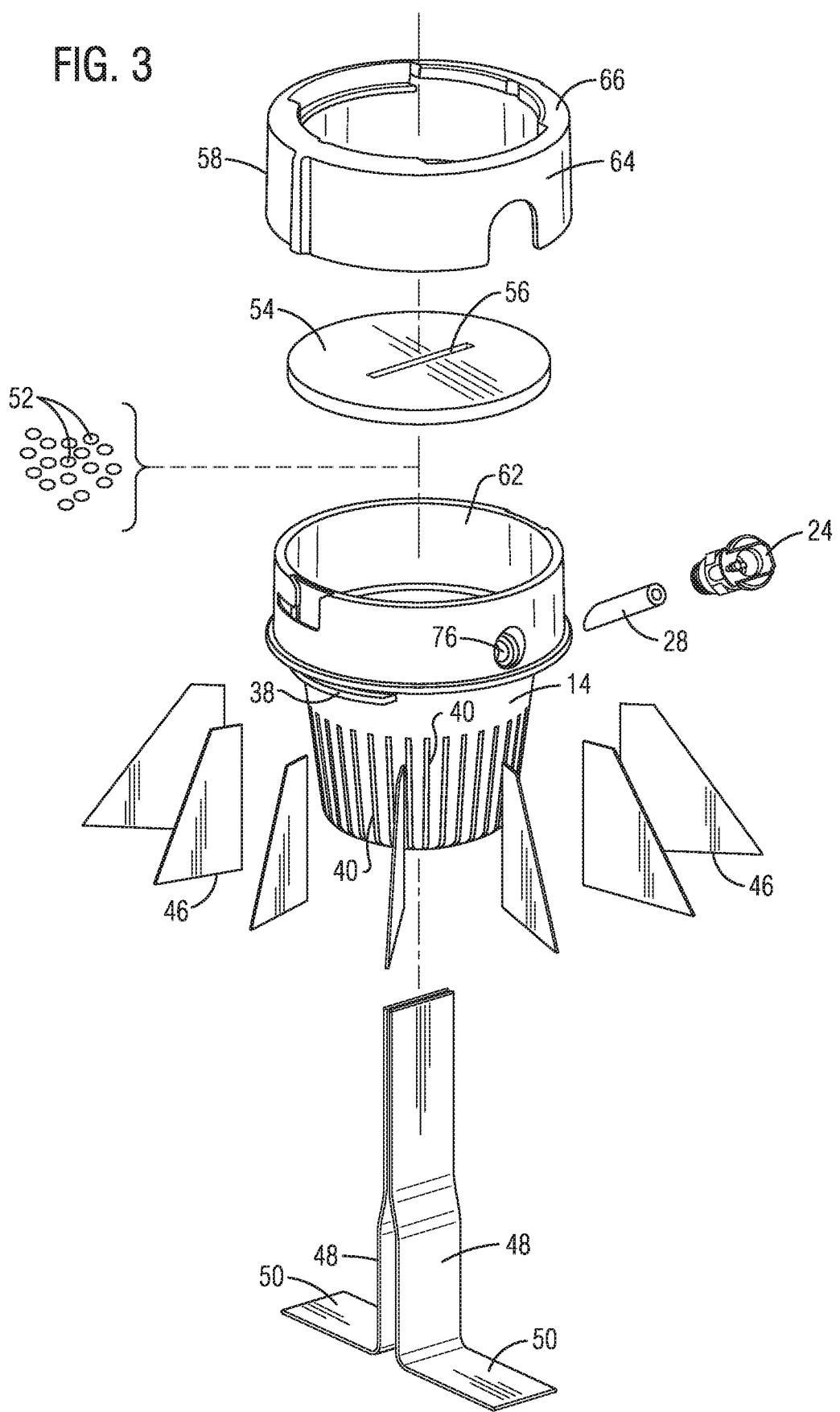
FIG. 3 is an exploded top isometric detail view of the root cylinder and wicking elements shown in FIG. 2.

Device 10 generally includes a water tank 12 which receives a root cylinder 14 (FIG. 3). The water tank 12 may be any enclosed volume having a cylinder aperture 16 (FIG. 2) sized to receive root cylinder 14 in a manner with a significant portion of root cylinder 14 located within water tank 12. In the embodiment illustrated, the water tank takes the form of a generally rectangular prism having a longitudinal axis generally aligned with the root cylinder 14, but could take the form of a circular prism, other polygon prisms, or as a partial hemispherical dome. A fully spherical water tank is possible, but not preferred due to water retention issues made more clear below.

Figure 4:
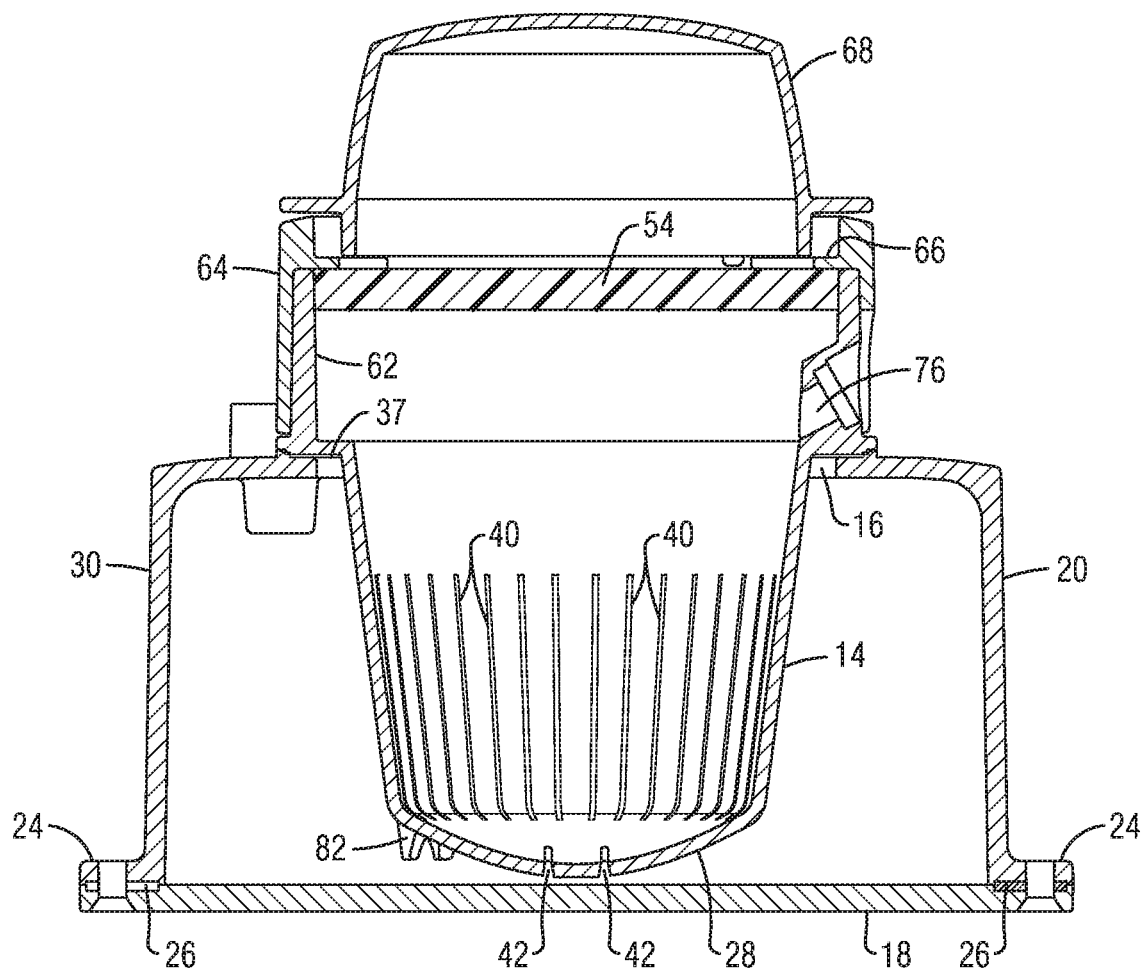
FIG. 4 is a side cross-sectional view, with components removed, along line 4-4 of FIG. 1.

Before continuing further with the description of device 10, an explanation of FIG. 4 is in order. A simple cross section of the assembled device 10 would result in many components not being shown as they were obscured by other components. As such, FIG. 4 is a partial cross section, or a cross section of a partial device 10. In particular the growth media, fin mats, wick mats and tank tube (among others) have all been removed in order for other components to be visible.

As best shown in FIG. 4, for ease of manufacture it is preferred that the water tank 12 be formed of a flat base plate 18 secured to a concave tank cover 20. The tank cover 20 may be secured to the base plate 18 by various means such as welding, adhesive, releasable connectors, etc. In the preferred embodiment show, they are secured by using a plurality of tank bolts 22 extending through both the base plate 18 and a peripheral flange 22 of the tank cover 20. To prevent any leaking of water, it is preferred that an elastomeric or similar gasket 26 be provided between flange 24 and base plate 18. It is possible for the water tank 12 to be formed in a vertically reversed arrangement (plate with aperture on top of non-apertured cover), or that the tank 12 be formed of a separate side wall with top and bottom faces secured to the sidewall edges. While other tank arrangements are possible, the illustrated arrangement provides water management advantages which make this the preferred arrangement; in particular a sharp corner about the lower interior periphery.

The root cylinder 14 preferably has an inward taper toward the interior of water tank 12. In the embodiment shown, it is formed generally as a frustum of a cone terminating in a semi hemispherical bottom end 28. A sidewall 30 (FIG. 4) extends upwardly from the periphery of bottom end 28, with the sidewall ending with a radially projecting cylinder flange 32. The water tank 12 will include an upper face 34 (through which the cylinder aperture 16 extends), and the cylinder flange 32 will abut against the upper face 34 when the root cylinder 14 is operatively mounted on the water tank 12. This will serve as a barrier to help seal the interior of water tank 12 about the cylinder aperture 16. As best illustrated in FIG. 4, it is important that the bottom end 28 be slightly spaced from but closely adjacent to, base plate 18. This will become apparent below.

While not required, it is preferred that root cylinder 14 be removably attached to the water tank 12. To that end a bayonet or similar connection is provided. In the embodiment illustrated, the cylinder aperture 16 includes a pair of spaced opposed notches 36 separated by a pair of spaced opposed aperture lands 37 extending radially inward. The sidewall 30 of the root cylinder 12 includes a mating pair of cylinder lands 38 spaced from the cylinder flange 32 by a distance to securely attach to the upper face 34. In this way the root cylinder 12 may be attached to and removed from the water tank 12. A permanent connection is possible between these two elements but not preferred.

The sidewall 30 of root cylinder 14 includes a number of flow apertures 40 to allow water to flow from the interior of water tank 12 to the interior of root cylinder 14. In the preferred embodiment, these flow apertures 40 take the form of narrow slits extending longitudinally. As explained more fully below, it is further preferred that several (or all) flow apertures 40 extend past the sidewall 30 into the bottom end 28, as shown in FIG. 4. It is preferred that the flow apertures have rounded ends to prevent pinning of water and a better flow of water. Similarly, the bottom face preferably may include one or more wick apertures 42 extending therethrough. In the preferred arrangement, the wick apertures 42 take the form of spaced parallel slits centrally located in the bottom end 28.

Mounted within some or all of the flow apertures are a plurality of fin mats 44. The fin mats 44 are formed of material which provides a wicking function to draw water into and through the fin mat by capillary or similar action. Various materials for such mats are well known. Each fin mat 44 includes a lower edge 46 and has a generally triangular shape tapering inward toward the root cylinder 14. The thickness of the fin mat 44 is chosen to allow them to be entered into (at least the desired) flow apertures 40. Each fin mat 44 will preferably extend into the root cylinder 14 by an amount sufficient to ensure water travels well into the root cylinder 14, such as about one quarter of the internal diameter of root cylinder 14. As illustrated in FIG. 2, the preferred arrangement of extending the flow apertures 40 into the bottom end 28 allows the fin mats 44 to extend below the bottom end 28. In fact, it is preferred that the fin mats 40 do extend below the bottom end 28 a sufficient distance to just touch the base 18 when in the assembled operative configuration (see FIG. 6).

For reasons made clear below, it is desired for the peripherally outer corners of the fin mats 44 to be closely adjacent or touch the side of the tank cover 20. In the embodiment shown, the water tank 12 is generally rectangular. This shape is preferred to allow for multiple devices 10 to be assembled together easily in an array while providing the maximum volume of water and nutrients for the intended plant. This rectangular shape necessitates that the peripheral lengths of the fin mats 44 vary depending on the radial placement of the particular fin mat 44. For example, fin mats 44 extending toward a corner of the water tank 12 would have a length greater than those extending to the side of water tank 12, as illustrated best in FIG. 2. It is of course possible to form the water tank 12 having different shapes such as triangular, hexagonal, round, etc. but in each case the fin mats 44 would preferable extend out to meet the sidewall of the water tank 12.

Mounted within the each of the two wick apertures 42 is a wick mat 48 having an elongated configuration and a width sufficient to allow threading of the wick mat 48 through the wick aperture 42. The wick mats 48 are formed of a material similar to (or identical to) the fin mats 44, and which will provide a wicking function to draw water into and through the mat by capillary or similar action. The wick mats 48 will extend upwardly along the longitudinal axis of the root cylinder 14, as well as extend out of the bottom end 28. It is preferred that the wick mats are sufficiently long that the lower ends form base sections 50 which will rest upon the base plate 18 when in the assembled operative configuration (see FIG. 6), extending in opposite directing.

The root cylinder 14 is partially filled with particulate growth media 52 (FIG. 3). The growth media is preferably non-frangible during normal use to avoid producing fines, and is either absorbent individually, and/or in mass will serve to draw water inward due to capillary or similar action. Suitable materials are known in the art for growth media 52. To prevent undesired egress of the growth media 52 from the root cylinder 14, there is provided a cylinder pad 54 in the form of a disc normal to the longitudinal axis of the root cylinder 14. It is desired that the growth media 52 be compacted in a relatively tight configuration to prevent surface tension from moving wetted particles or portions of growth media 52 away from unwetted particles or portions of growth media 52. The amount of growth media 52 is chosen to fully fill the root cylinder 14 to just above the assembled position of the cylinder pad 54. The cylinder pad 54 is preferably formed of a material with at least partially elastic propertied such that the assembled cylinder pad 54 will press upon the growth media 52 to maintain its compact and uniform distribution. Several foamed or sponge materials are known for such a cylinder mat, and it is preferred if this material is sufficiently porous to allow gas transfer.

The cylinder pad 54 may be secured in place by having a diameter which friction fits against the interior face of the root cylinder 14. However, a more secure fit is desired to avoid unintentional egress of the growth media 52. Many arrangements are possible such as a peripheral groove (not shown) on the inner face of the root cylinder 14, which receives the peripheral edge of the cylinder mat 54. Adhesives are possible but not desired so as to allow disassembly. The cylinder pad 54 could have a larger diameter (not shown) and friction fit over the rim of the root cylinder 14. Regardless of the method of securing the cylinder mat 54 to the root cylinder 14, the cylinder pad 14 will have a growth aperture 56 extending therethrough. In use, a seed will germinate within the growth media, and therefore beneath the cylinder pad 54. The sprout and resulting plant will need to extend through the cylinder pad 54, and this growth aperture 56 meets this need. While different shapes are possible, a slit is preferred so that the top ends of the wick mats 48 may extend therethrough as shown in FIG. 2. The free ends of the wick mats 48, and in particular the space therebetween, provide a convenient locator for seeds to be placed in the growth media 52. These free ends of the wick mats 48 may also act as a guide for sprouts to find their way through the growth aperture 56.

In the preferred embodiment shown, the root cylinder 14 includes a cylinder collar 62 extending upwardly from the cylinder flange 32. Cylinder pad 54 is unsecured but located adjacent the free edge of the cylinder collar 62. A cap ring 58 then secures the cylinder pad 54 in place. In particular, the cap ring 58 includes a cap collar 64 which closely receives the cylinder flange 32, and the upper edge of the cap collar 64 includes a radially inward cap land 66 which will extend at least partially over the cylinder pad 54 to secure it in place. The cap collar 64 and cylinder collar 62 may be secured in a number of ways, including mating threads. In the embodiment shown, there is a bayonet connection.

It may be desired to more securely close the device 10 to prevent egress of water or other material: prior to use; during germination; after use when still fully or partially wet; or at other times. To this end, device 10 may include a cover 68 which may be secured to cap ring 58, such as by a bayonet arrangement. The cover 68 may be opaque to prevent light and thus inhibit bacterial growth, or a clear cover could be provided to allow entry of light during germination or early growth. The cover 68 would of course be removed entirely for growing larger plants.

The device 10 also includes an arrangement for introducing water and/or nutrients including a main water line 70 and an auxiliary port 72. Auxiliary port 72 will be discussed first, and includes a coupling 74 with integrated water-tight hinged cover. The coupling 74 extends through a port hole 76 in the cylinder collar 72. In the preferred embodiment shown, the cap collar 64 extends below the position of the port hole 76, and as such a cut-out is provided on the cap collar at the position of the port hole 76 when assembled. Securing the coupling 74 within port hole 76 (such as by threads or bayonet) will thus prevent unintended removal of the cap ring 58 from the root cylinder 14 and thus ensures the cylinder pad 58 remains in place unless intended to be removed.

The inner end of coupling 74 may have a port tube (FIG. 3) secured thereto. In operation the water tight hinged cover may be opened and a syringe (not shown) or similar device attached to the coupling 74. Water and/or nutrients may then be passed through the coupling 74 into the root cylinder 14 at moderate pressure. As evidenced by the name, this auxiliary port 72 is intended as a back-up. For example, if it appears that the plant in device 10 is not receiving water it may not be advisable to remove root cylinder 14 from water tank 12 to determine the problem. This would pose a serious risk of water or debris exiting the device 10. The auxiliary port allows introduction of water directly to the root cylinder 14 as a stop gap measure until harvest, a period of thrust producing stabilizing pseudo gravity, or other more convenient time to inspect the interior of device 10.

The main water line 10 is similarly connected to a main coupling 80. This main coupling 80 is similar or identical to coupling 74, and will also include an integrated water-tight hinged cover. Coupling 80 is secured in an appropriate aperture in the water tank 12. In the embodiment shown, the coupling 80 is located on the upper face 34 of water tank 12, permitting easy access from above should there be multiple devices 10 in an array. It is of course possible to attach the port 80 through the side or bottom of water tank 12 if desired. One critical factor of the present invention is the placement of the free end of the main water line 70 where water will exit into water tank 12. This free end will be closely adjacent to the bottom end 28 of root cylinder 14. To ensure this placement, the root cylinder 14 (or the water tank 12) includes an alignment tab 82 (FIG. 4) having a notch to receive the free end of the water line 70.

Figure 5:
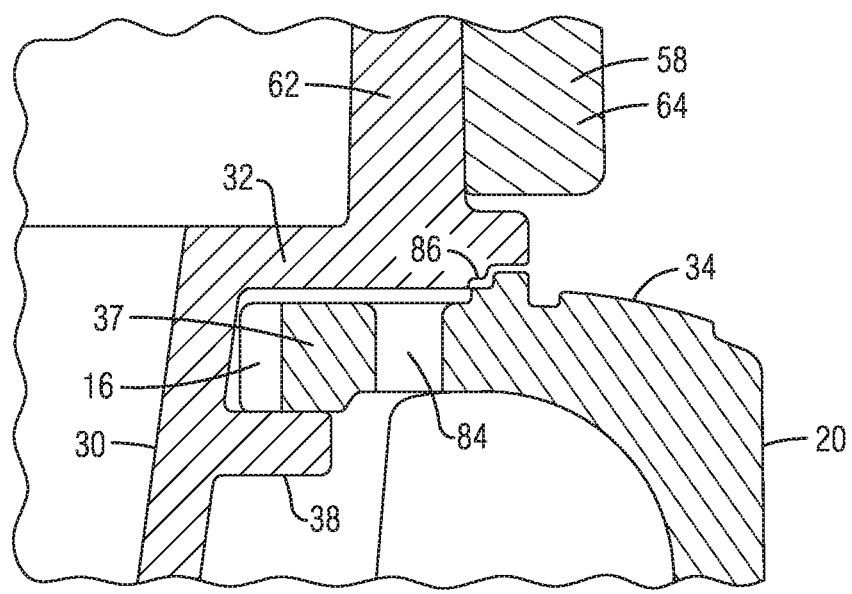
FIG. 5 is a detailed cross-sectional view along line 5-5 of FIG. 1.

Similar to the auxiliary port, in operation the water tight hinged cover of main coupling 80 may be opened and a syringe (not shown) or similar device attached to the coupling 74. Water and/or nutrients may then be passed through the main coupling 80 into the water tank 12 at moderate pressure. As may be envisioned, as the water is introduced, and equal volume of air must be expelled from the water tank 12. To this end, a plurality of vent holes 84 extend through the lands 37 in cylinder aperture 16. As best illustrated in FIG. 5, these vent holes 84 will lead to the close fit between the cylinder flange 32 and the upper face 34 of water tank 12. This close fit will allow air to exit at a rate allowing the desired desire fill rate of water into the water tank 12. Note that in the preferred embodiment the cylinder flange 32 and upper face 34 include a mating step as at 86 which creates a tortuous path limiting light into the interior of water tank 12. Also note that flow apertures 40 are sized such that the upper ends of the flow apertures 40 (and the upper edges of the assembled fin mats 44) are spaced from the lands 37 and vent holes 84.

Having thus described the physical components of device 10 and the general ingress of water and egress of air, the unique water flow control features of the present invention will now be described. In this regard, first note that water behaves quite differently in microgravity. Balls of water are easily formed and can drift off. Water may find geometric intersections which cause it to flow under surface tension in non-intuitive directions. While this poses a danger within the craft cabin, it also causes problems within a tank desired to be filled under microgravity conditions. In particular, should the water (or a portion of the water) move to block the air vent of the tank, then pressure can build as more water is introduced. The result may be that the internal tank pressure prevents further water flow into the tank, or that the internal pressure forces the water through the air vent and into the craft cabin. To prevent this, many structural areas of the device 10 use to advantage the premise that water in microgravity is drawn to sharp geometric corners, and is not drawn to curved smooth corners. The present device 10 arranges these features in a way which should cause the water within water tank 12 to mimic a filling pattern similar to that under normal gravity, even while in microgravity conditions.

The fill characteristics described below are dependent upon the flow rate in the main water line 70 being below a certain threshold. In general, if the water is introduced at a very high flow rate its inertia will be greater than surface tension bonds and the water will fill water tank 10 in a chaotic manner. Moderately slow, steady manual operation of the syringe (not shown) should provide an acceptable flow rate, and of course a bit of practice can determine the desired range of fill rates to achieve the desired fill pattern.

The main water line 70 is of course the first point of introduction of the water into the water tank 12. As noted above, the free end of the main water line 70 is closely adjacent to the minimum space between the bottom end 28 of the root cylinder 14 and the water tank 12, which in the present embodiment if base plate 18. Note that the free end of water line 70 will preferably be within the space between the bottom end 70 and water tank 12 (in other words within the radius of the bottom end 28), just not at the minimum spacing between bottom end 28 and water tank 12. The spacing of this free end of main water line 70 is preferably less than 5 millimeters from the minimum spacing point, and in general should be less than the diameter of a water ball having sufficient inertia (due to flow rate into the water thank 14, extraneous bumping of the device 10, microthrust, etc.) to detach from the free end of water line 70 and float randomly.

Reference is made to FIGS. 6a-6e which illustrate the device 10 being filled with water (and/or nutrients) 90. Starting at the beginning, FIG. 6A illustrates that, in essence, it is desired that water leaving water line 70 into the water tank 12 expand in the typical ball pattern at the free end of water line 70 only slightly before the outer edge of such a water ball encounters the bottom end 28 and interior of tank 12. At that point the water 90 is expected to bridge the space between bottom end 28 and water tank 12 while remaining in contact with the free end of main water line 70. As water continues to be introduced via main water line 70, the water 90 in water tank 12 will continue to be held between bottom end 28 and the interior of tank 12 while expanding radially outward to form a general torus shape as shown in FIG. 6a.

During this initial filling, the water 90 in tank 12 will contact the wick mats 48, and a portion of water 90 will begin to be drawn into the interior of root cylinder 14. As the water 90 in the wick mats 48 contacts adjacent growth media 52, a portion of the water 90 will begin to be drawn out of the wick mats 48 to wet the growth media 52. As the torus of water under bottom end 28 expands radially outward, it will eventually encounter the radially inner lower edges of the fin mats 44 and the water will begin to wick up the fin mats 44 to enter root cylinder 14 and begin wetting more of the growth media 52.

With continued filing the torus of water 90 will expand to contact the lower edges of those flow apertures 40 (if any) which do not have fin mats 44 inserted therein. Given the rounded ends of these flow apertures 40 and their narrow dimensions, surface tension will draw the water 90 upward within each such flow aperture 40. Where growth media 52 abuts against such a filled flow aperture 40, the water 90 in such flow aperture 40 will be drawn into the interior of the root cylinder, again wetting more growth media 52.

The interior of water tank 12 beneath the bottom end 28 is flat (or relatively flat or only gently curved) and as such the water 90 will not be significantly drawn along by surface tension; instead maintaining the noted torus shape. However, the intersection of the fin mats 44 with the outer face of the side wall 30 of root cylinder 14 will form a relative small angle (more than 90 but much less than 120 degrees). This tight angle between components will tend to draw water 90 therealong. As such, the water 90 will tend to move upward along the exterior of sidewall 30, although this may be initially slow due to this portion of the water 90 being wicked into the fin mats 44 themselves. At this point, the filling of water tank 12 with water 90 will appear similar to that shown in FIG. 6a.

The growth media 52 at this point has water entering via wick mats 48, fin mats 44, and flow apertures 40 (if provided). Given the desired wicking and or absorption properties of the growth media 52, it is anticipated that controlled steady introduction of more water 90 into water tank 12 via main water line 70 will result in complete wetting and/or filling of the root cylinder 28 up to (and possibly including, depending upon the properties of) the cylinder pad 54. This is illustrated at FIG. 6b.

At this point the draw of water into the root cylinder 28 should be completed, and further water 90 introduced will begin to fill the water tank 12 outside the root cylinder 28. As noted previously, it is desired that the lower edges of the fin mats 44 just touch the interior of water tank 12. As such, a tight angle (in this embodiment shown, essentially 90 degrees) is formed along the intersection each of each fin mat 44 and the interior of water tank 12 (in particular the base plate 18). The water will therefore be drawn along this intersection radially outward from the root cylinder 28 along the interior of the water tank 12. As noted previously, a similar action will draw the water 90 upward along the intersection of the fin mats 44 and the outer face of sidewall 30. As such, the water 90 will begin to fill the tank 12 in a conical shape tapering upward. With continued filling this conical shape will increase in diameter. This is the configuration illustrated in FIG. 6c.

As noted previously, it is preferred that the peripherally outer corners of the fin mats 44 to be closely adjacent or touch the side of the tank cover 20, and further that the interior of the water tank 12 include a sharp corner about its lower periphery (adjacent the outer corners of fin mats 44). With continued filling of tank 12 with water 90, the water 90 moving radially outward along the bottom edge of fin mats 44 will reach the sharp corner at the lower periphery of the water tank 12 (the intersection of base plate 18 and tank cover 20). This sharp corner about the lower periphery of water tank 12 will tend to hold the water. This, together with angles between fin mats 44 and the sidewall 30 of root cylinder and the now formed angle between the surface of water 90 and the other portions of fin mats 90 is expected to hold the water 90 toward the base plate 18 (or other bottom of water tank 12). This is illustrated in FIG. 6d.

The water 90 may be continued to be introduced until the upper surface of the water is at or adjacent the upper ends of the flow apertures 40. It is not desired to fill further, as that is the extent of the water control geometries and further filling invites unexpected flow of water 90. Further, as noted above, the upper ends of the low apertures 40 are spaced from the vents 84. Stopping further filing at this point this should keep the water 90 spaced from the vents 84 as well, which is one of the main points of this invention. In this regard, note the previous discussion that the upper peripheral interior corner of the water tank 12 have a relatively large radius. As may be seen, this is to avoid creating a sharp angle which might draw water 90 further upward that desired. This too helps ensure that the water 90 remains spaced from the vents 84. This completed filling is illustrated in FIG. 6e.

As may be seen, the present device 12 permits filling of water in a microgravity environment with the resulting fill characteristics being similar to that under gravity (or thrust). This allows the device 10 to be more easily and safely filled after launch. In a microgravity environment this is true at any orientation. The device 10 should of course be oriented such that "up" is the direction of anticipated thrust to maintain the water 90 in the desired "down" or "gravity" orientation as in FIG. 6e. Additional water 90 may added as desired via main water line 70 or via auxiliary port 72.

From the foregoing it will be seen that this invention is one well adapted to attain all ends and objects set forth above together with the other advantages which are inherent within its structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth of shown in the accompanying drawings is to be interpreted as illustrative, and not in a limiting sense.

What is claimed is:

1. A microgravity agricultural device, comprising:
   a water tank defining a volume, having an open first end, one or more vents, and a coupling for attaching a water source;
   a root cylinder having at least one side wall and a closed bottom end, said at least one side wall being secured in said open free end, and said bottom end being closely adjacent said water tank, said root cylinder further including one or more flow apertures extending from adjacent said closed bottom end toward said open free end; wherein each of said one or more flow apertures has a rounded end and a width which will draw water along said flow aperture; a quantity of growth media received within said root cylinder;

a main water line extending from said coupling to a position locating a free end of the main water line between said closed bottom end of the root cylinder and said water tank, such that water exiting said free end will directly contact one or both of said closed bottom end and said water tank; and one or more fin mats, each having a first portion received through one of the one or more flow apertures to extend within said root cylinder and contact said growth media.

2. The microgravity agricultural device as in claim 1, wherein said one or more vents is spaced from an upper end of each of said one or more flow apertures.

3. The microgravity agricultural device as in claim 1, wherein each of said one or more fin mats include a bottom edge generally parallel to said bottom end, with each of said one or more fin mats being sized such that said bottom edge abuts said water tank.

4. The microgravity agricultural device as in claim 3, wherein in said water tank includes a sharp corner along its lower periphery and adjacent an outer end of said bottom edge of each of said one or more fin mats.

5. A microgravity agricultural device, comprising:
a water tank defining a volume, having an open first end, a vent, and a coupling for attaching a water source;
a root cylinder having at least one side wall and a closed bottom end, said at least one side wall being secured in said open free end, and said bottom end being closely adjacent said water tank, said root cylinder further including a flow aperture extending from adjacent said closed bottom end toward said open free end; wherein said flow aperture has a rounded end proximate the closed bottom end of the root cylinder and an upper end spaced a distance from said vent and has a width which will draw water along said flow aperture;
a fin mat having a first portion received through said flow aperture to extend within said root cylinder and in contact with said growth media;
a quantity of growth media received within said root cylinder; and
a main water line extending from said coupling to a free end positioned closely adjacent a narrow space formed between said closed bottom end and said water tank, such that water exiting said free end will contact one or both of said closed bottom end and water tank.

6. The microgravity agricultural device as in claim 5, wherein said fin mat includes a bottom edge generally parallel to said bottom end, with said fin mat being sized such that said bottom edge abuts said water tank.

7. The microgravity agricultural device as in claim 6, wherein in said water tank includes a sharp corner along its lower periphery and adjacent an outer end of said bottom edge of said fin mat.

8. A microgravity agricultural device, comprising:
a water tank defining a volume and having an interior bottom, an aperture shaped to receive a root container, a vent in fluid communication with said volume of the water tank, and a coupling for attaching a water source; and a main water line extending from said coupling to a position most proximate said interior bottom of said water tank and terminating with an open free end;
a root container having a closed bottom end that is shaped as a frustum extending toward said interior bottom of said water tank;
wherein one of said closed bottom end of said root container has and said interior bottom of said water tank includes, an alignment feature, wherein said open free end of said main water line is received in said alignment feature; and
wherein, said alignment feature positions said open free end of the main water line within a radius of the closed bottom end of the root container such that water exiting said open free end is in direct contact with one or both of said closed bottom end of said root container and said interior bottom of said water tank and will expand radially outward as a general torus shape between said closed bottom end and said interior bottom, and air exits said water tank via said vent.

9. The microgravity agricultural device of claim 8, wherein said root container includes a flow aperture extending from said closed bottom end up a sidewall toward said aperture shaped to receive a root container, the flow aperture having a width which will draw water along said flow aperture.

10. The microgravity agricultural device of claim 9, wherein said closed bottom end of said root container includes a wick aperture and has an elongated wick mat received therethrough; wherein said elongated wick mat has a first end forming a base section resting along said interior bottom of said water tank and a second end within or extending beyond said root container.

11. The microgravity agricultural device of claim 9, comprising a quantity of growth media received within said root container.

12. The microgravity agricultural device as in claim 9, having a fin mat received through said flow aperture to extend within said root container.

13. The microgravity agricultural device of claim 8, wherein said root container includes a flow aperture extending from adjacent said closed bottom end toward said aperture shaped to receive a root container, said flow aperture having a width which will draw water along said flow aperture.

14. The microgravity agricultural device of claim 8, wherein said root container includes a plurality of flow apertures extending from said closed bottom end up a sidewall toward said aperture shaped to receive a root container and having a fin mat received in the plurality of flow apertures.

15. The microgravity agricultural device of claim 8, wherein an apex of said frustum defines a minimum spacing point between said closed bottom end of said root container and said interior bottom of said water tank.

16. A microgravity agricultural device, comprising:
a water tank defining a volume and having an interior bottom, an aperture shaped to receive a root container, a vent in fluid communication with said volume of the water tank, and a coupling for attaching a water source; and
a main water line extending from said coupling to a position proximate said interior bottom of said water tank and terminating with an open free end;
a root container having one of a closed bottom end having an alignment feature and said interior bottom of said water tank includes an alignment feature, having received said open free end of said main water line; and wherein, when water exits said open free end of the main water line, said water is in direct contact with one or both of said closed bottom end of said root container and said interior bottom of said water tank and will expand between said closed bottom end and said interior bottom, and air exits said water tank via said vent;

wherein said closed bottom end of said root container includes a wick aperture and has an elongated wick mat received therethrough;

wherein said elongated wick mat has a first end forming a base section resting along said interior bottom of said water tank and a second end within or extending beyond said root container.

17. The microgravity agricultural device of claim 16, wherein said root container includes a flow aperture extending from said closed bottom end up a sidewall toward said aperture shaped to receive a root container, the flow aperture having a width which will draw water along said flow aperture.

18. The microgravity agricultural device as in claim 17, having a fin mat received through said flow aperture to extend within said root container.

19. The microgravity agricultural device of claim 16, wherein said root container includes a plurality of flow apertures extending from said closed bottom end up a sidewall toward said aperture shaped to receive a root container and having a fin mat received in the plurality of flow apertures.

* * * * *